(12) United States Patent
Doron

(10) Patent No.: US 6,365,038 B1
(45) Date of Patent: *Apr. 2, 2002

(54) METHOD OF PRODUCING COMBUSTIBLE PRODUCTS FROM HEAVY FUEL RESIDUE

(75) Inventor: Benjamin Doron, Jerusalem (IL)

(73) Assignee: Ormat Industries Ltd., Yavne (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/511,999

(22) Filed: Aug. 7, 1995

Related U.S. Application Data

(63) Continuation-in-part of application No. 08/197,551, filed on Feb. 17, 1994, now Pat. No. 5,571,490, which is a continuation of application No. 07/835,358, filed on Feb. 14, 1992, now abandoned, which is a continuation of application No. 07/683,690, filed on Apr. 11, 1991, now abandoned, application No. 08/511,999, which is a continuation-in-part of application No. 08/274,575, filed on Jul. 13, 1994, now Pat. No. 5,501,160, which is a continuation of application No. 08/034,887, filed on Mar. 19, 1993, now abandoned, application No. 08/511,999, which is a continuation-in-part of application No. 08/365,327, filed on Dec. 28, 1994, now abandoned, which is a continuation of application No. 08/078,502, filed on Jun. 18, 1993, now abandoned, application No. 08/511,999, which is a continuation-in-part of application No. 08/318,191, filed on Oct. 5, 1994, now Pat. No. 5,505,144, which is a continuation of application No. 08/131,165, filed on Jan. 13, 1994, now abandoned, which is a continuation of application No. 08/082,821, filed on Jun. 18, 1993, now abandoned, which is a continuation of application No. 07/834,790, filed on Feb. 13, 1992, now abandoned, which is a continuation-in-part of application No. 07/827,274, filed on Jan. 29, 1992, now abandoned, which is a continuation of application No. 08/582,597, filed on Jan. 3, 1996, now Pat. No. 5,651,321.

(51) Int. Cl.$^7$ .......... C10B 53/00; C10B 51/00; C10B 47/00; B09B 3/00
(52) U.S. Cl. .......... 208/434; 208/428; 201/21; 201/22; 201/23; 201/27; 201/28
(58) Field of Search .......... 208/434, 428; 201/21, 22, 23, 24, 27, 28; 202/96

(56) References Cited

U.S. PATENT DOCUMENTS 3,162,583 A * 12/1964 Hemminger et al. .......... 201/22

(List continued on next page.)

FOREIGN PATENT DOCUMENTS

AT 19644 * 4/1929 .......... 208/434

Primary Examiner—Walter D. Griffin
(74) Attorney, Agent, or Firm—Nath & Associates PLLC; Gary M. Nath; Jerald L. Meyer

(57) ABSTRACT

Asphaltene and oil shale are pyrolyzed at substantially atmospheric pressure for producing combustible products and carbonaceous material. A combustor combusts the carbonaceous material and produces flue gases which are supplied to a utilization device, and hot ash which is fed back to the pyrolyzer.

10 Claims, 3 Drawing Sheets

U.S. PATENT DOCUMENTS

| | | | | |
|---|---|---|---|---|
| 4,064,018 A | * | 12/1977 | Choi | 201/21 |
| 4,141,794 A | * | 2/1979 | Choi | 201/21 |
| 4,145,274 A | * | 3/1979 | Green et al. | 201/22 |
| 4,147,593 A | * | 4/1979 | Frischmuth et al. | 201/22 |
| 4,243,489 A | * | 1/1981 | Green | 201/22 |
| 4,339,249 A | * | 7/1982 | Berkestad et al. | 55/269 |
| 4,375,402 A | * | 3/1983 | Durai-Swamy | 208/411 |
| 4,376,033 A | * | 3/1983 | Calderon | 208/402 |
| 4,421,524 A | * | 12/1983 | Chittick | 201/22 |
| 4,505,809 A | * | 3/1985 | Brunner et al. | 208/400 |
| 4,536,279 A | * | 8/1985 | Audeh | 208/434 |
| 4,601,812 A | * | 7/1986 | Anderson et al. | 201/32 |
| 4,722,783 A | * | 2/1988 | Sieg et al. | 208/434 |
| 4,931,171 A | * | 6/1990 | Piotter | 208/409 |
| 5,296,102 A | * | 3/1994 | Nicklin | 201/28 |
| 5,372,708 A | | 12/1994 | Gewertz | 208/434 |
| 5,388,534 A | * | 2/1995 | Doron et al. | 110/233 |
| 5,501,160 A | * | 3/1996 | Goldman et al. | 110/229 |
| 5,505,144 A | * | 4/1996 | Doron et al. | 110/233 |
| 5,571,490 A | | 11/1996 | Bronicki et al. | 423/244 |
| 5,651,321 A | * | 7/1997 | Siniakevith et al. | 110/341 |
| 5,857,421 A | * | 1/1999 | Doron et al. | 110/346 |

* cited by examiner

US 6,365,038 B1

METHOD OF PRODUCING COMBUSTIBLE PRODUCTS FROM HEAVY FUEL RESIDUE

This application is a Continuation-In-Part Application of the followiong applications: Ser. No. 08/197,551 which was filed on Feb. 17, 1994 and issued as U.S. Pat. No. 5,571,490, which is a continuation of Ser. No. 07/835,358 filed on Feb. 14, 1992, now abandoned, which is a continuation of Ser. No. 07/683,690 filed on Apr. 11, 1991, now abandoned; Ser. No. 08/274,575 which was filed on Jul. 13, 1994 and issued as U.S Pat. No. 5,501,160, which is a continuatin of Ser. No. 08/034,887 filed on Mar. 19, 1993, now abandoned; Ser. No. 08/365,327 which was filed on Dec. 28, 1994, now abandoned which is a continuation of Ser. No. 08/078,502 filed on Jun. 18, 1993 now abandoned and from which a continuation application (Ser. No. 08/582,597 filed on Jan. 3, 1996) issued as U.S. Pat. No. 5,651,321; and Ser. No. 08/318,191 which was filed on Oct. 5, 1994 and issued as U.S. Pat. No. 5,505,144, which is a continuation of Ser. No. 08/131,165 filed on Jan. 13, 1994, now abandoned, which is a continuation of Ser. No. 08/082,821 filed on Jun. 18, 1993, now abandonded, which is a continuation of Ser. No. 07/834,790 filed on Feb. 13, 1992, now abandonded, which is a continuation-in-part of Ser. No. 07/827,274 filed on Jan. 29, 1992, now abandonded.

DESCRIPTION

Technical Field

This invention relates to a method of and means for producing combustible products from heavy residue oil and more particularly to a method or and means for producing combustible products from asphaltene.

BACKGROUND OF THE INVENTION

Recently the requirement for better quality and lighter fuels for among other things to comply with the air pollution regulations has been increasing. Conventionally, distillation of fuel leaves a heavy residue having bitumen characteristics which is cracked using a catalyzer such that cracking takes place at a temperature of a few hundred degrees C. or higher. After this cracking, an even less friendly residue remains called asphaltene which is difficult and uneconomical to crack since it poisons the catalysts and also requires high temperatures which usually results in large investments. Thus, conventionally, asphaltene is blended with another fuel of relatively high caloric or heating value and then sold since asphaltene itself does not possess good qualities for combustion. Evenso, under present conditions more and more asphaltene is being produced.

In U.S. Pat. No. 5,372,708, a process for the thermal dissolution of oil shale which is rich in mineral constituents is disclosed. In the process disclosed in the '708 patent, a mixture of these so-called low grade oil shales with a fraction of heavy fuel having a boiling point above 350° C. is cracked and a hydrocarbon fuel having a boiling point up to 350° C. is recovered from the gases and vapors leaving the cracking reactor with the residue produced having mineral constituents being recovered and used as a raw material for various purposes, such as chemical products, like asphaltene, etc. or for combusting in the cracker for producing hot gases which heat the mixture being cracked.

It is therefore an object of the present invention to provide a new and improved method of and means for producing combustible gases from heavy fuel residue such as asphaltene which substantially overcomes or significantly reduces the disadvantages outlined above.

BRIEF DESCRIPTION OF THE INVENTION

In accordance with present invention, a method for producing combustible products such as a low viscosity liquid fuel and fuel gas is provided comprising pyrolyzing asphaltene together with a low grade solid fuel containing materials or minerals which have catalytic properties such as oil shale, certain types of low grade coal, etc. Preferably according to the present invention the step of pyrolyzing asphaltene together with oil shale is carried out by adding asphaltene to a pyrolyzer, adding oil shale to a pyrolyzer, combusting carbonaceous material remaining in the pyrolyzer by supplying the remaining carbonaceous material to a combustor preferably separate from the pyrolyzer and adding ash produced by the combustion of the carbonaceous material to the pyrolyzer for supplying the heat for the pyrolysis process. Such pyrolysis is advantageous since oil shale and other such materials have many catalytic qualities which can aid in the cracking of the asphaltene as well as in capturing sulfur or compounds of sulfur. Furthermore, the use of ash for providing the heat for the pyrolysis process is also advantageous since more catalysts are added to the material being pyrolyzed.

In addition, in a further embodiment of the present invention, a method of producing combustible products such as low viscosity fuel and fuel gas is also provided comprising pyrolyzing asphaltene together with ash produced from low grade fuel such as oil shale. In this embodiment less fuel is obtained.

Moreover, the present invention comprises providing apparatus for carrying the above mentioned method steps of the present invention.

BRIEF DESCRIPTION OF THE DRAWINGS

Embodiments of the present invention are described by way of the example with reference to the accompanying drawings wherein.

DETAILED DESCRIPTION

Figure 1:
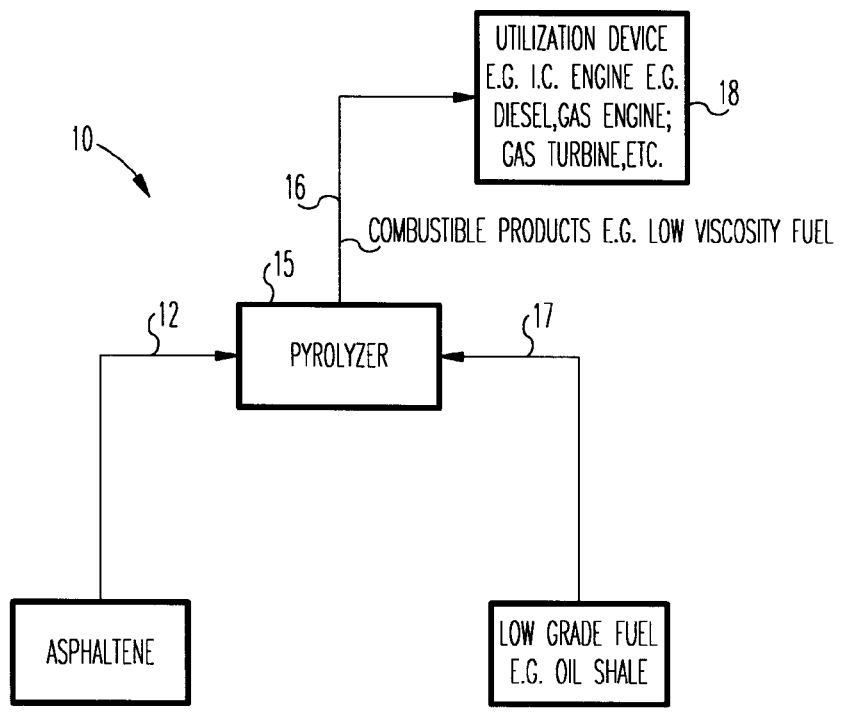
FIG. 1 is a block diagram which represents, in a schematic way, apparatus for carrying out the present invention.

Referring now to FIG. 1, reference numeral 10 designates apparatus for producing combustible products such as low viscosity liquid fuel and fuel gas from heavy oil residue. As shown in FIG. 1, heavy oil residue or asphaltene is added to pyrolyzer 15 using means 12 while low grade fuel, preferably oil shale, is also added to the pyrolyzer using means 17. As a result of the pyrolysis of asphaltene and the oil shale combustible products such as low viscosity liquid fuel and fuel gas is extracted via means 16 and is used in utilization means 18 in eg. an internal combustion (i.c.) engine such as a diesel or gas engine or in a gas turbine as fuel. When used in a gas turbine, the fuel may be used directly in the combustion chamber of the gas turbine or may be used to indirectly heat compressed air exiting the compressor of the gas turbine in an indirect heat exchanger.

Figure 2:
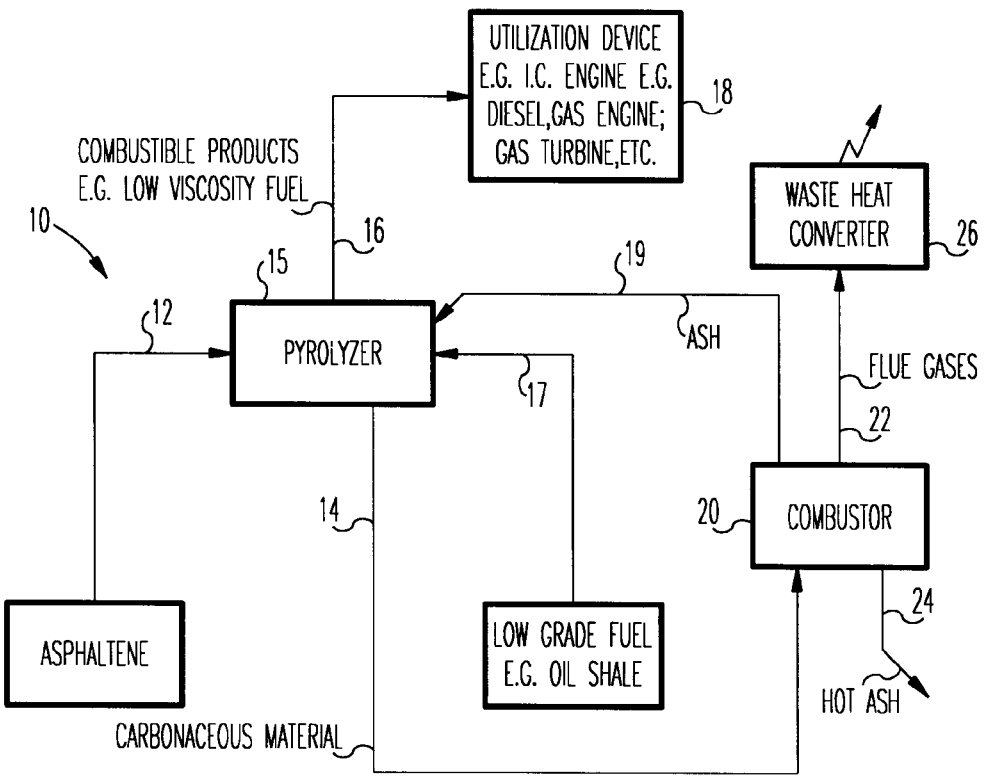
FIG. 2 is a block diagram which represents another embodiment of apparatus for carrying out the present invention.

In the preferred embodiment of the present invention as shown in FIG. 2, pyrolysis is carried out in pyrolyzer 15 by utilizing ash produced when carbonaceous material remaining in the pyrolyzer is transported by supply means 14 for combustion in combustor 20. As can be seen from FIG. 2, hot ash is extracted from combustor 20 and fed to pyrolyzer 15 via feed means 19 in order to maintain pyrolysis taking place therein preferably at a temperature of between about 400 and 550° C. and also preferably at about atmospheric pressure. Also here, as shown, combustible products such as low viscosity fuel and fuel gas can be used in utilization means 18 in eg. an internal combustion (i.c.) engine such as a diesel or gas engine or in a gas turbine as fuel. When used in a gas turbine, the fuel may be used directly in the combustion chamber of the gas turbine or may be used to indirectly heat compressed air exiting the compressor of the gas turbine in an indirect heat exchanger.

In measurements checked by Fisher standard assay techniques using apparatus according the embodiment described in relation to FIG. 2, when 10 to 35% of the total amount of a mixture of asphaltene and oil shale is asphaltene, a fuel in the amount of 20 to 50% of the amount of asphaltene used in the mixture was obtained ie. for every kg of asphaltene used in the mixture, 200 to 500 gram of low viscosity liquid fuel and fuel gases was obtained. At present this is considered the best mode for carrying out the present invention.

Figure 3:
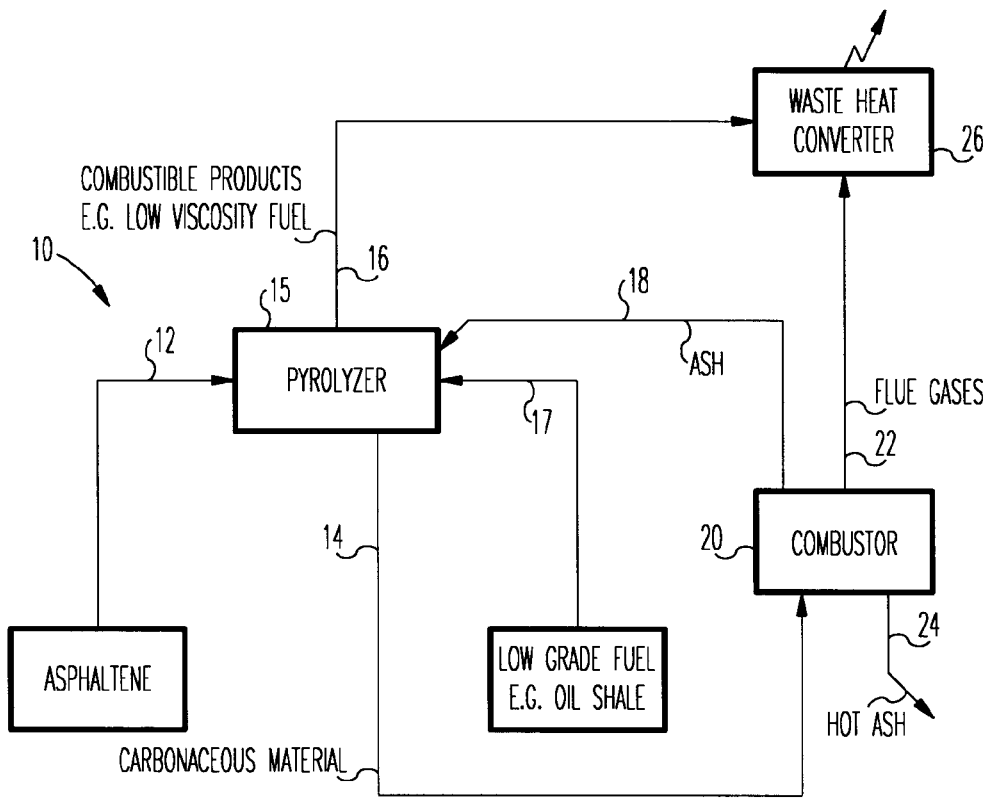
FIG. 3 is a block diagram which represents a further embodiment of apparatus for carrying out the present invention.

Alternatively, as shown in FIG. 3, hot ash extracted from combustor 20 via means 24, hot flue gases exiting the combustor via stack 22 as well as low viscosity liquid fuel and fuel gas produced from the pyrolyzer which has a relatively high calorific or heating value of above approximately 3,000 kcal/kg can be used in waste heat convertor 26 for producing electric power.

The carbonaceous material obtained in the process is quite high quality having a calorific or heating value of around 800 to 1,500 kcal/kg and this carbonaceous material can be combusted quite easily.

Figure 4:
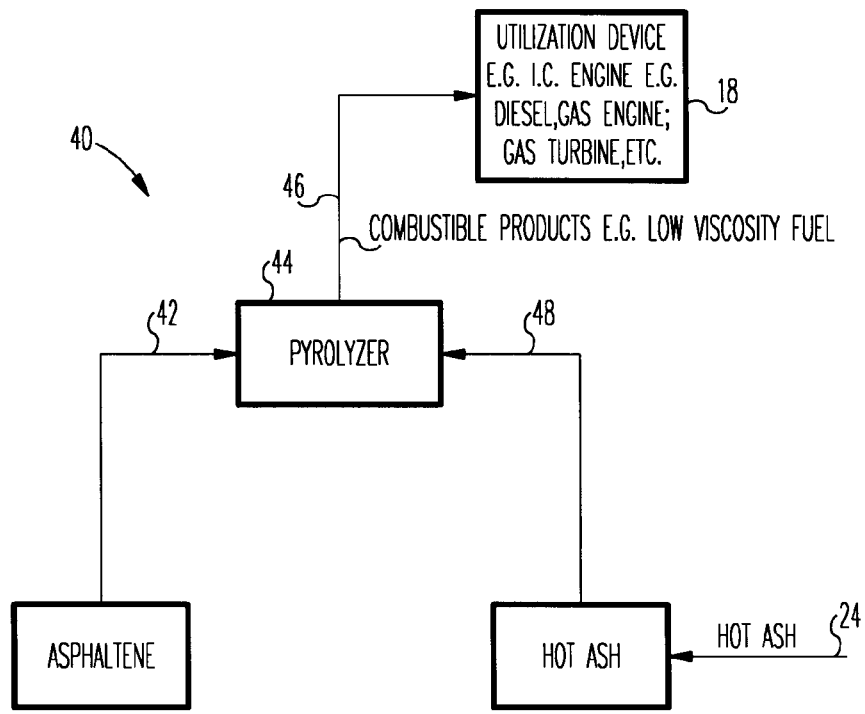
FIG. 4 is a block diagram which represents another embodiment of part of apparatus for carrying out the present invention.

Due to this, if preferred, ash extracted at 24 can be pyrolyzed together with asphaltene to produce further combustible products such as low viscosity fuel and fuel gas as show in FIG. 4. However, the amount of fuel produced here when the asphaltene is pyrolyzed with the ash is less than the amount produced when the low grade fuel itself is pyrolyzed with the asphaltene in pyrolyzer 15 for example.

Figure 5:
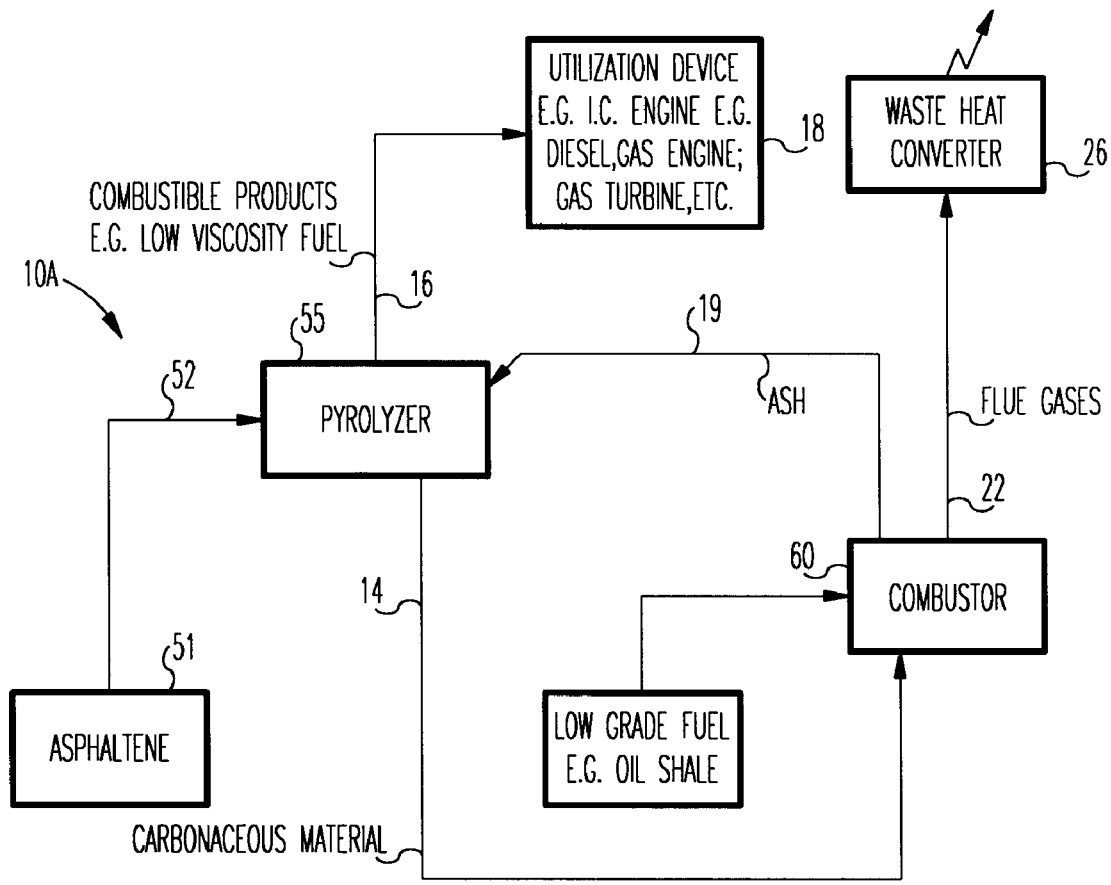
FIG. 5 is a block diagram which represents a still further embodiment of apparatus for carrying out the present invention.

FIG. 5 shows further embodiment 10A of the present invention. Rather than supplying the low grade fuel to the pyrolyzer as shown in FIG. 2, the low grade fuel is supplied to combustor 60 via means 59. In this manner, substantially all ash produced in combustor 60 is used for supplying heat to pyrolyzer 55 for pyrolyzing asphaltene supplied by from asphaltene supply 51 via supply means 52 to pyrolyzer 55.

Furthermore, while in the above description, the use of low grade fuel such as oil shale, certain types of low grade coal, etc, is disclosed, the present invention also contemplates the use, rather than the use of these low grade fuels, of relatively cheap minerals which contain materials that can act as a catalyst for producing low viscosity fuel and fuel gases in the manner disclosed previously.

The advantages and improved results furnished by the method and apparatus of the present invention are apparent from the foregoing description of the preferred embodiment of the invention. Various changes and modifications may be made without departing from the spirit and scope of the invention an described in the appended claims.

What is claimed is:

1. A method for producing a low viscosity liquid fuel and fuel gas from asphaltene and oil shale comprising the steps of:
   a) pyrolyzing in a pyrolyzer asphaltene together with oil shale for producing combustible products and carbonaceous material and capturing sulfur compounds;
   b) combusting said carbonaceous material for producing hot ash and flue gases; and
   c) adding said hot ash to said pyrolyzer.

2. A method according to claim 1 wherein the step of combusting said carbonaceous material is carried out in a combustor separate from said pyrolyzer.

3. A method according to claim 1 wherein said combustible products are supplied to a utilization means.

4. A method according to claim 3 wherein said step of supplying said combustible products to said utilization means is carried out by supplying said combustible products to a gas turbine.

5. A method according to claim 4 wherein said step of supplying said combustible products to said gas turbine is carried out by supplying said combustible products as fuel directly to the combustion chamber of a gas turbine.

6. A method according to claim 4 wherein said step of supplying said combustible products to said gas turbine is carried out by supplying said combustible products as fuel to an indirect heat exchanger used to indirectly heat compressed air exiting the compressor of a gas turbine.

7. A continuous method for producing a low viscosity liquid fuel and fuel gas from asphaltene and oil shale and for recovering waste heat, comprising the steps of:
   a) conveying asphaltene to a pyrolyzer; and
   b) conveying oil shale to the pyrolyzer; and
   c) conveying hot ash to the pyrolyzer; thereby producing, in the pyrolyzer, a hot-ash-oil-shale-asphaltene mixture; and
   d) pyrolyzing the hot-ash-oil-shale-asphaltene mixture thereby producing volatile combustible products and non-volatile carbonaceous material;
   e) conveying said volatile combustible products to a utilization device which combusts the volatile combustible products thereby recovering the useful energy in the volatile combustible products; and f) conveying said non-volatile carbonaceous material to a combustor; and g) combusting in the combustor said carbonaceous material thereby producing hot ash and flue gases; and h) conveying said hot ash to said pyrolyzer; and i) conveying said flue gases to a waste heat converter; and j) recovering waste heat from the hot flue gases in the waste heat convertor.

8. A method for producing combustible products comprising the steps of:

a) combusting oil shale in a combustor and producing hot ash and flue gases;

b) supplying asphaltene to a pyrolyzer;

c) supplying said hot ash to said pyrolyzer containing said asphaltene and producing said combustible products and carbonaceous material; and d) supplying said carbonaceous material to said combustor and combusting said oil shale together with said carbonaceous material.

9. A method according to claim 8, wherein the amount of oil shale and hot ash supplied to the combustor substantially captures sulfur compounds present in said pyrolyzer.

10. A method according to claim 4 wherein flue gases produced by combusting said oil shale together with said carbonaceous material are used to produce electricity using a waste heat converter.

* * * * *